United States Patent Office 3,403,043
Patented Sept. 24, 1968

3,403,043
CERAMIC-METAL SEALS
Stewart Philip Thompson, London, England, assignor to International Standard Electric Corporation, New York, N.Y., a corporation of Delaware
No Drawing. Filed Mar. 23, 1965, Ser. No. 444,100
Claims priority, application Great Britain, Apr. 14, 1964, 15,340/64
8 Claims. (Cl. 117—22)

ABSTRACT OF THE DISCLOSURE

A fired metallic coating on cereamic material includes a mixture of metal oxides, having distinct melting temperatures below that of the ceramic, and a metallising powder. The mixture does not chemically react with the ceramic and permits brazing of metal articles thereto with a hermetic seal therebetween and without melting the coating.

---

The invention relates to the metallising of ceramic articles whereby they may be brazed to metal members or to other similarly metallised ceramic parts. The invention finds particular application in the manufacture of hermetically sealed envelopes for electric discharge devices and terminal plates for other electrical apparatus.

In at least one commonly used metallising process for the production of vacuum-tight metal to ceramic seals, temperatures in the range 1600°–1650° C. have to be used for satisfactory results on high alumina ceramics. This entails the use of expensive furnaces with high fuel and maintenance costs, while distortion of ceramic parts due to softening of the ceramic is also liable to occur. Furthermore, a particular metallising process may be satisfactory only for a limited range of ceramic compositions. This is particularly the case with the well known Mo-Mn process in which the manganese enters into chemical combination with the ceramic surface.

It is an object of the present invention to provide a metallising process for which the firing temperature may be well below the melting point of any constituent of the ceramic and which is not critical as to the composition of the ceramic.

According to the invention there is provided a ceramic article having thereon a fired coating of a mixture of metal oxides having a definite melting temperature below that of any constituent of the ceramic and not forming a chemical reaction product with the ceramic, the coating being loaded with a metallising powder such that the ceramic article may be hermetically sealed to a metal article by brazing the metal article to the loaded coating or onto a layer of another metal plated on the coating.

The metallising powder is of metal or a substance having metallic properties such that it can be brazed to or plated with another metal. It must, of course, be sufficiently refractory to withstand the firing process and not to become oxidised to an extent which will prevent subsequent brazing or plating. In this regard consideration must be paid to the choice of furnace atmosphere during the firing process, as will be discussed later.

It should be mentioned that in the prior art suggestions are to be found for uniting metals to ceramic materials by the use of metal-loaded glazes. A glass, however, is essentially non-crystalline and hence does not have a distince melting point. Rather, it can soften and flow over quite a wide range of temperatures, with attendant disadvantages when brazing. With the present invention, provided the temperatures involved are below the distinct melting temperature of the oxides of the coating, the coating cannot flow during the subsequent processing of the ceramic article or the apparatus in which it is incorporated. Furthermore, since the coating is bonded to the surface without a chemical reaction; with the ceramic, different ceramic composition may be used for the article.

The metal oxides are preferably present in the coating as eutectic mixtures, so that the firing process can be restricted to temperatures a few degrees above the eutectic temperatures, though it has been found advantageous in some cases to fire to 100° C. above the eutectic temperature.

In carrying out the invention, the metallising powder is mixed in a suitable binder with either the mixed oxides required in the final coating or with metal compounds which yield these oxides during the firing process. Examples of suitable binary eutectics are given in the following table.

Table

| Composition: | Melting point, ° C. |
|---|---|
| 92% $Cu_2O$; 8% $SiO_2$ | 1060 |
| 50% $Li_2O$; 50% $SiO_2$ | 1025 |
| 82% $SiO_2$, 18% $Li_2O$ | 1030 |
| 55% $Cr_2O_3$; 45% $CaO$ | 1020 |
| 52% $CaO$; 48% $B_2O_3$ | 1150 |
| 36% $MgO$; 64% $B_2O_3$ | 1140 |
| 25% $SiO_2$; 65% $MnO$ | 1200 |

The above eutectic mixtures wet the ceramic surface and can be fired a few degrees above the melting point. The choice of metallising powder is quite wide. As well as moylbdenum and tungsten, fired in a nonoxidising atmosphere, nickel-chrome alloy, stainless steel, silicon carbide and molybdenum disilicide may be used with firing in air. Though these do acquire a thin protective oxide coating, the oxidation is not sufficient to prevent brazing or plating with known techniques.

The furnace atmosphere, the choice of oxides and the choice of metallising powder are somewhat interrelated. Thus some oxides would be reduced by hydrogen, while some metallising powders would suffer excessive oxidation if fired in air. Thus if molybdenum or tungsten are used as metallising powders, firing would normally be in hydrogen and the oxides would be chosen from those not reduced by firing in hydrogen. Nevertheless it is permissible to start with a higher oxide, such as $MnO_2$ and reduce it to $MnO$, the firing temperature being kept below that required for the manganese to bond chemically with any component of the ceramic. If the reduced oxide forms a eutectic with the other oxide or oxides, appropriate proportions having been chosen for the initial mixture, the firing temperature can readily be kept sufficiently low.

The proportion of metallising powder to mixed oxides is governed largely by the space factor of the particles of metallising powder. If the coating has too much metal, voids may be formed and the eventual seal may not be vacuum-tight. On the other hand there must be sufficient metal to provide the requisite surface area for subsequent brazing or plating. The proportion of metallising powder in satisfactory coatings usually exceeds 50% by volume and, typically, volumetric proportions of 60% metallising powder to 40% oxides in the dry state before mixing with binder for application to the ceramic article have been used. The particle size of the metallising powder is recommended to be within the range 1 to 5µ.

The thickness of coating recommended in embodiments of the invention is about 0.001 inch to 0.0015 inch, after firing. A shrinkage in thickness of up to 50% is commonly found to occur during the firing process.

Satisfactory results have been obtained on a ceramic of high alumina content using a mixture consisting, before firing, of 77 grams $MnO_2$, 37 grams $SiO_2$ and 170 grams Mo. Firing was done in wet hydrogen at 1250° C., the manganese dioxide being reduced to MnO and forming a eutectic with the silica. Satisfactory results have also been obtained with this mixture and firing temperature on beryllia and Forsterite.

A presently preferred method of metallising ceramic articles according to the invention is given in the following example.

Example

A mixture of dry powders was made up as follows:

| | Grams |
|---|---|
| Molybdenum powder, 99.87% or greate purity, particle size 1–5$\mu$ | 125 |
| Manganese dioxide (technical grade) | 19 |
| Silica powder (technical grade) | 24.5 |
| High purity alumina | 10 |

To this mixture 80 millilitres of a binder consisting of nitrocellulose in amylacetate was added and the aggregate was milled in a planetary mill for 15 hours. The maximum particle size after milling was specified to be less than 10$\mu$.

Parts of the ceramic articles to be metallised were coated with above mixture to a thickness (after drying) of 0.003 inch. The articles were sleeves and collars for thermionic valves and terminal plates for other apparatus of sizes varying up to 12 cms. diameter.

The articles were then introduced into a hydrogen furnace which was heated up slowly to avoid thermal shock to the ceramic until a temperature of 1250° C. was attained, wet hydrogen being continuously passed through the furnace. The furnace temperature was maintained at 1250° C. for half an hour, after which the ceramic articles were allowed to cool to about 200° C. before removal.

After chemical cleaning the metallised parts were nickel plated, after which the ceramic articles were available for bonding to nickel-chrome-iron alloy metal parts by conventional brazing processes.

What I claim is:

1. A ceramic article having thereon a fired coating of a mixture of metal oxides having a distinct melting temperature below that of any constituent of the ceramic and below that required for bonding by chemical reaction with the ceramic, and including a metallising powder such that the ceramic article may be hermetically sealed to a metal article by brazing, the coating remaining hard at temperatures below the melting point of said oxides, said metal oxides being present in the coating as a eutectic mixture, the coating being fired at temperatures above the eutectic temperature of between 1000 to 1300° C., said metal oxides being selected from the group consisting of cuprous oxide, silica, lithium oxide, chromic sesquioxide, calcium oxide, boric anhydride, magnesium oxide, manganese oxide, and alumina, said metallising powder being selected from the group consisting of tungsten, molybdenum, nickel-chrome alloy, stainless steel, silicon carbide, and molybdenum disilicide.

2. An article as claimed in claim 1 wherein the proportion of metallising powder to metal oxides in the coating exceeds 50% by volume.

3. The article of claim 2 including a layer of another metal plated on the coating for brazing to said metal article.

4. The method of coating a ceramic article including applying a mixture of metallising powder together with metal oxides onto the article, and firing said article with said mixture thereon at a temperature of between 1000–1300° C. which is in excess of the melting temperature of said oxides but below that required for bonding to ceramic by chemical reaction in an atmosphere which does not reduce the compounds to the metal and does not cause excessive oxidation of the metallic powder to prevent brazing thereto, the coating remaining hard at temperatures below the melting point of said oxides, said oxides being selected from the group consisting of cuprous oxide, silica, lithium oxide, chromic sesquioxide, calcium oxide, boric anhydride, magnesium oxide, manganese oxide, and alumina, and said metallising powder being selected from the group consisting of tungsten, molybdenum, nickel-chrome alloy, stainless steel, silicon carbide, and molybdenum disilicide.

5. The method of claim 4 including plating a layer of another metal on the coating for brazing to a metal article.

6. The method of claim 4 wherein said metallising powders are selected from the group consisting of nickel-chrome alloy, stainless steel, silicon carbide, and molybdenum disilicide, and said firing is in air.

7. The method of claim 4 wherein said metallising powders are selected from the group consisting of molybdenum and tungsten, and said firing is in a hydrogen atmosphere.

8. The method of claim 7 wherein said metal oxides are selected from the group consisting of manganese oxide, silica and alumina.

References Cited

UNITED STATES PATENTS

| 2,898,236 | 8/1959 | Long et al. | 117—124 |
| 2,904,456 | 9/1959 | Nolte | 117—212 |
| 3,023,492 | 3/1962 | Bristow | 117—227 XR |
| 3,180,841 | 4/1965 | Murphy et al. | 117—227 XR |
| 3,189,476 | 6/1965 | Cowan | 117—160 XR |
| 3,296,017 | 1/1967 | Rubin | 117—160 XR |

WILLIAM L. JARVIS, *Primary Examiner.*